April 28, 1925.
A. D. MEISELBACH
1,535,370
MEANS AND METHOD OF MANUFACTURING METAL ARTICLES
Filed March 5, 1921    2 Sheets-Sheet 2
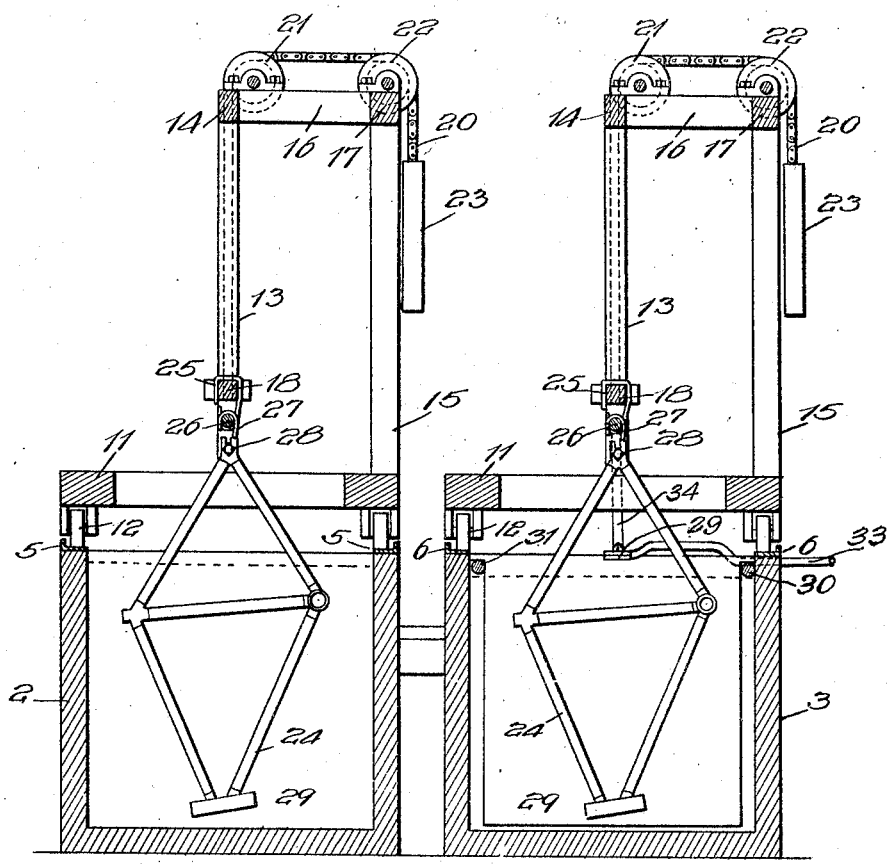

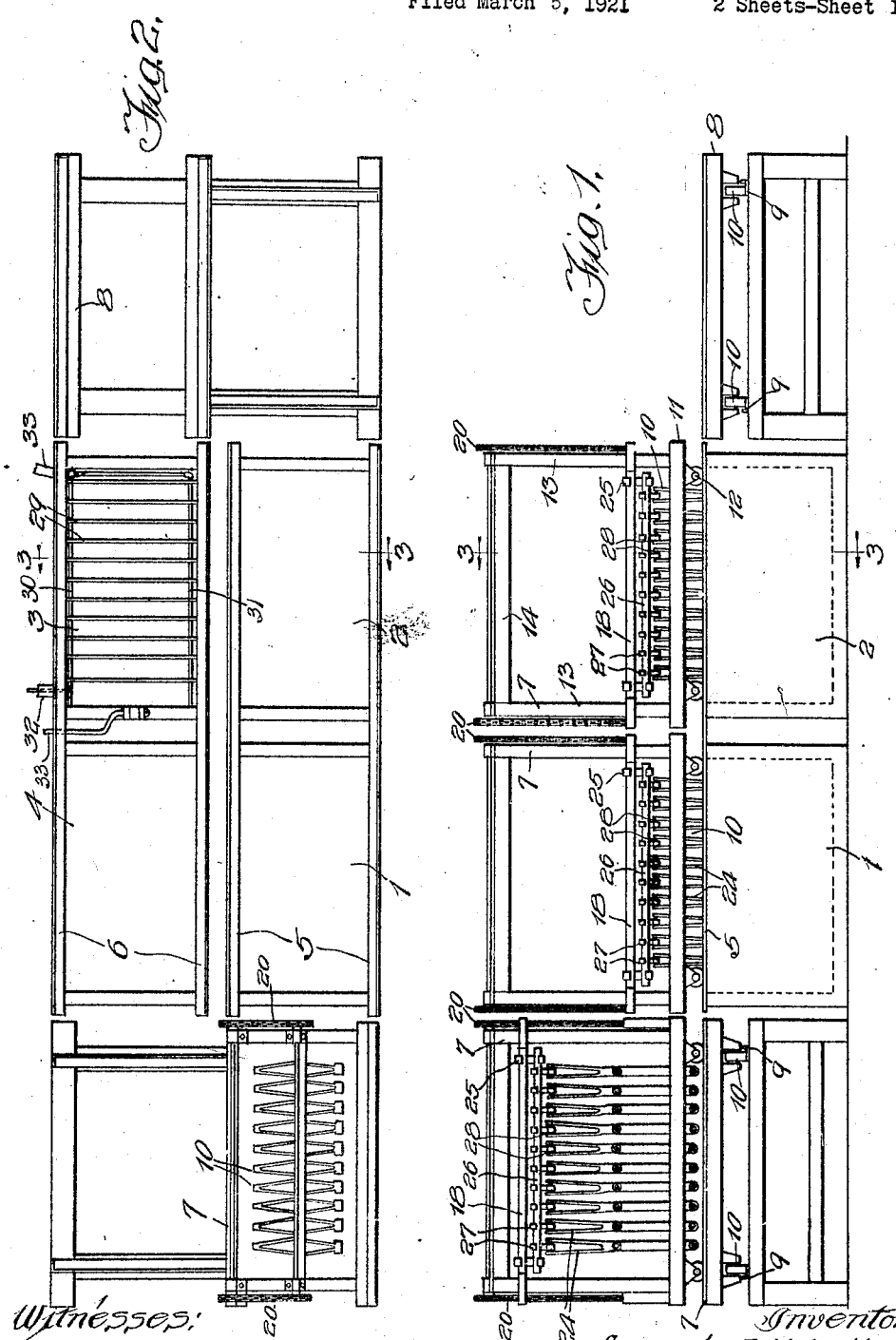

Patented Apr. 28, 1925.

1,535,370

UNITED STATES PATENT OFFICE.

AUGUST D. MEISELBACH, OF CHICAGO, ILLINOIS.

MEANS AND METHOD OF MANUFACTURING METAL ARTICLES.

Application filed March 5, 1921. Serial No. 449,939.

*To all whom it may concern:*

Be it known that I, AUGUST D. MEISELBACH, a citizen of the United States, and resident of Chicago, in the county of Cook and State of Illinois, have invented certain new and useful Improvements in Means and Methods of Manufacturing Metal Articles, of which the following is a specification.

My invention relates to improvements in manufacturing systems and processes and has special relation to means and methods of handling and operating upon metal articles which may be typified by bicycle parts such as tubular frames of bicycles.

In the manufacturing of many metal articles it is necessary to submerge or immerse them in various solutions or baths or to apply various liquids such as enamel, varnish or the like to them.

In some processes it is necessary to immerse the articles in baths of acid more or less strong and the handling of the metal articles into and out of the acid baths is a most unpleasant work and is fraught with dangerous possibilities to the person and clothing of the operator as well as to the articles themselves and the building in which the work is done.

Again it frequently occurs that it is necessary to successively immerse the articles in several different baths, such for instance as acid, rinsing water, baths in which electricity is applied to the articles, etc., all of which in the ordinary methods especially of handling such articles as bicycle frames necessitates the individual handling of same into and out of these baths. Unless great care is taken by the workman in such individual handling of the articles some are subjected to the action of the bath a greater or lesser time than the others with the results that the finished product is neither uniform as to quality nor of the desirable high grade.

In my improved system, once the articles are entered upon the process they practically require no individual handling or attention, each specific article of a group is given exactly the same treatment as every other one. If there is an acid bath in the process the workman does not run any risk of burning himself or destroying his clothing.

In the application of my invention which I have illustrated, I have devised a system for operating upon bicycle frames after the connections have been dipped into hot brazing material for brazing the several joints.

The various parts of the frame and particularly the connections or joining parts are covered with borax and spelter which must be removed before the next operation of machining the bearing parts of the frame is done.

I provide a series of vats of suitable size and depth and preferably arranged in two parallel rows.

I provide a series of racks or frames on wheels adapted to be positioned successively over the several vats, tracks being provided on which the racks can be readily moved from one vat to the next. I arrange transfer platforms at the ends of the rows of vats so that the racks can readily make the complete circuit. Each rack is provided for a counter balance support from which a plurality of the frames can hang and by means of which all of the frames on one rack can be readily lowered into or raised out of the tank or vat simultaneously.

As prepared for such work the first bath in the series contains an acid bath two per cent strong which is adapted to remove the borax. The next bath may contain a soda water or clear water for neutralizing or washing off the acid. The next bath is arranged for applying a current of electricity to the frames for electrically removing the spelter or brass from the outer surfaces of the frames or joints and the last of the series of vats preferably containing hot clear water for the purpose of cleaning the frames and heating them to cause them to dry quickly.

The object of my invention is to reduce to a minimum the manual manipulation of metal articles which it is necessary to immerse into a number of baths in the process of manufacture; to reduce the labor expense in such manufacture; to increase the quality of the product; and generally to provide a system whereby many objectionable features such as the possibilities of splashing of acids shall be eliminated.

While I have illustrated my invention as being worked out for the particular purpose of performing certain operations upon bicycle frames, it should be understood that my invention is not thus limited in its scope and application.

For a clear understanding of my invention attention is directed to the accompanying drawings forming part of this specification and in which:—

Figure 1 is a side elevation of the novel apparatus which I have found best adapted for practising by novel methods and which embodies by invention as related to the improvements in devices and mechanisms for such work;

Figure 2 is a plan view of the apparatus shown in Fig. 1 except that only one carriage is illustrated;

Figure 3 is a transverse vertical sectional view on the line 3—3 of Figures 1 and 2;

Figure 4 is a fragmentary horizontal, sectional view on the line 4—4 of Figure 3;

Figure 5 is a fragmentary end view of a carriage; and

Figure 6 is a fragmentary detail view particularly disclosing the standard for making electrical connection to the bar upon which the frames are hung.

In the form of apparatus as arranged for the practice of my invention for facilitating the manufacture of tubular articles such as bicycle frames, I preferably provide four tanks or vats 1, 2, 3 and 4, and I find that it simplifies the transfer of the carriages to arrange the tanks or vats in two parallel rows as shown, vat No. 1 being the initial vat, and vat No. 4 being the finishing vat.

I arrange suitable tracks 5 and 6 extending longitudinally over the two rows of vats upon which carriages 7 can readily be moved along to position the carriages over the vats and to move them from one to another.

For facilitating the transfer of the carriages from one track to the other that is from one row of vats to the other row I provide transfer tables 7 and 8 arranged at the two ends of the rows. The table 7 is arranged adjacent to the vats 1 and 4 and table 8 is arranged adjacent to the vats 2 and 3. Each table is provided with extensions of the tracks and are mounted on transverse tracks 9 and 10 so that the tables can be positioned longitudinally in alignment with the tracks 5 and 6 for receiving and delivering the carriages.

Each carriage 7 comprises a horizontal rectangular frame 11 supported on suitable wheels 12 for running on the tracks 5 and 6. The frame 11 is equal in dimensions to the size of the vats so that when a carriage is positioned over a vat substantially the whole of the open top of the vat is exposed through the frame.

Upon the frame 11 I erect vertical standards 13 at the middle part of each end of the frame, the tops of the standards being rigidly connected by a horizontal member or brace 14. I brace these standards transversely of the frame by suitable posts or uprights 15 at one side of the frame and one at each end, the upper ends of the standards 15 being rigidly connected to the middle standard by cross braces or members 16 and furthermore the tops of the standard 15 are connected by a longitudinal brace member 17. The several members at the top constitute an elevated rectangular frame which is adapted to carry the counterbalancing means for the articles to be operated upon. This means consists of a longitudinal bar 18 having ends 19 adapted to be guided upon the standards 13 and to be connected to chains 20, one at each end. These chains 20 lead over the pulleys 21 and 22 at each end of the top of the carriage and are connected to counter-balancing weights 23 at their rear ends. The bar 18 extends from end to end of the carriage and is positioned above the longitudinal central line of the vats.

For supporting such articles as bicycle frames 24 on the bars 18 I preferably provide hooked supports 25, one at each end of the bar 18 which engage and support a longitudinal support bar 26.

On the bar 26 by means of hooked supports 27 I individually hang the bicycle frames 24.

For convenience, at one stage in the process of passing a current of electricity through the frames I preferably make the hooks 25 of some insulating material such as fibre and I make the individual hooks 27 of metal.

In hanging bicycle frames upon hooks 27 I secure a temporary rear axle or bolt 28 between the rear forks of each frame and hang these bolts on the hooks 27. As thus supported the heads 29 of the bicycle frames hang downwardly and as best shown in Figure 3 the liquid can readily drain out of the frames when they are lifted clear of the vat.

The frames are preferably spaced along the bar 26 so as to be out of contact and separated from each other.

I arrange the counter-weights 23 so that when the complement of bicycles are hung on the carriage the frames can be easily raised and lowered and will remain in such position.

The vats are deep enough and the up and down movement of the frames is adequate to permit the frames to be lowered into the vat far enough to be properly acted upon and to be lifted clear of the vat so that the carriages can be readily moved from one vat to another.

In this novel process as arranged for the work upon bicycle frames I provide an acid solution preferably of about two per cent strength in vat No. 1, water or soda water in vat No. 2, a suitable solution in vat No. 3 for the application of electricity to the frames, and a clear hot water in vat No. 4.

In the layout illustrated I provide five of the carriages 7 one to be positioned over each of the four vats and one to be on one of the transfer tables.

In initiating the process I first position one of the carriages on the transfer table 7 where it is in position for filling, the other four carriages being empty and positioned over the several vats. I proceed to fill the first carriage with its complement of frames and then position the transfer table 8 in alignment with the vats 1 and 2 and proceed to push the line of three carriages that is the one just filled and those over vats Nos. 1 and 2 along the track 5 until the carriage which has just been filled is positioned over vat 1 and one of the carriages is on the transfer table 8. I then lower the frames into the acid bath in vat No. 1, and proceed to shift the carriages to get ready to fill the second carriage. This is done by first shifting the transfer tables 7 and 8 into alignment with the vats 3 and 4 and then moving the three carriages longitudinally on the track 6 to place an empty carriage on the transfer table 7 and free the transfer table 8.

I may then shift the transfer tables back into alignment with the track 5 and proceed to fill the second carriage. When this is done the first complement of frames have remained long enough in the acid bath and I lift the frames out by lifting on the bar 18 then I shift the three carriages in the first row longitudinally as before until the second carriage is positioned over vat No. 1, the first carriage is above vat No. 2 and the adjacent empty carriage has been placed upon the transfer table 8. I then lower the frames into the vats Nos. 1 and 2 and proceed as before until the process has been fully initiated and filled carriages are over all four of the vats.

When a filled carriage has been positioned over vat No. 4 and the frames carried thereby have been immersed the proper time and raised again the several carriages are shifted as before placing this carriage with the frames which have been finished in clean hot water upon the transfer table 7, where they are allowed to remain during the time occupied by the lowering of the several complements of frames into their several vats and which is usually sufficient to permit the finished frames to dry as they are still hot. The finished frames are then removed from the hooks and are now ready for the next process in their manufacture.

In vat No. 3 I arrange division plates 29 transversely of the vat and supported at their ends on metal bars 30 and 31. These plates are arranged so that as the frames are lowered into the vat the frames are separated or spaced apart by the plates but the frames do not touch the plates. I connect one lead 32 of an electric circuit to the plates 29 through the bars 30 and 31, the two bars being cross connected at one end by a bar 32' and arranged the other lead 33 to connect to the metal bars 26 upon which the frames are hung and by this means I am enabled to pass a suitable current of electricity through the frames causing the surplus spelter to be removed.

For the purpose of connecting the lead 33 to the bars 26, I provide a standard 34 pivotally mounted on a bracket 35 secured on one end wall of the vat 3, and having a U-shaped socket 36 at its upper end in which the rod 26 can rest when it is lowered to lower the tubular frames into the vat. The pivotal mounting of the standard 34 permits it to be turned down out of the way to permit the frame carrying carriage to move along the rails over the vat. The lead 33 is connected at its inner end to the fixed bracket 35.

When the frames are on the transfer table I have an opportunity to protect the various parts thereof by suitable varnish to prevent the electric current applied in vat No. 3 from removing any metal not desired to be removed if such protection is necessary.

It should be understood that while I have illustrated and described a process which requires the use of water or acid or soda solutions in the vats, various features of my invention are valuable for other purposes such for instance as for applying anti-rust, paint or enamel to the frames or to similar metallic articles or for use in plating the articles instead of removing metal and I claim my invention as adaptable to these various uses as well as for the typical and illustrative use fully described and shown herein.

As many modifications of my invention will readily suggest themselves to one skilled in the art I do not limit or confine my invention to the specific steps or order of procedure or to the specific arrangement of devices, mechanisms and parts herein shown and described.

I claim:

1. The herein described system for use in manufacturing metal articles, which comprises a series of associated vats for containing liquids in which the articles are to be immersed, one of said vats being adapted for applying electricity to said articles, tracks extending longitudinally of the series of vats, separable and independent carriages movable on the tracks and over the vats, the carriages having open bottoms through which the articles can pass up and down, an article support on each carriage movable freely up and down thereon to raise and lower the articles and adapted at its upper limit to hold the articles above the vats, so that the carriage can pass freely from vat to vat and at the lower limit of its movement to lower the articles down into the vats to immerse the articles in the liquid in the vats.

2. In a system of the kind described a series of vats of substantially uniform length arranged end to end, tracks arranged longitudinally of the series of vats, carriages having wheels for movement along the tracks, the carriages being separable and independent and of equal length with the vats and adapted when in end to end contact on the tracks to be capable of being positioned as a series over the series of vats.

3. The herein described system for manufacturing metal articles, which comprises a series of associated vats for containing different liquids in which the articles are to be immersed, tracks extending over the series of vats, wheeled carriages for supporting the metal articles adapted to be moved from vat to vat, and said carriages having supports for the metal articles from which the articles are adapted to freely hang in separated relation, as and for the purpose specified.

4. The herein described system for manufacturing metal articles, which comprises a series of associated vats for containing different liquids in which the articles are to be immersed, tracks extending over the series of vats, wheeled carriages movable along the tracks from vat to vat from the first through the series, supports on the carriages for the articles, the supports arranged to permit the articles to hang therefrom in parallel relation and in separated condition, the supports arranged to be lowered to lower the articles into the vats and to be raised to permit the carriages to be advanced from vat to vat, and means permitting the carriages to be readily returned to the entrance end of the tracks.

5. In the system herein described, a series of vats arranged in a row, tracks extending longitudinally of the row of vats and upon which carriages are movable over the vats from vat to vat in the series, the carriages adapted while in end to end contact on the tracks to be positioned so that successive carriages are located over successive vats.

6. In the system herein described, a series of vats arranged in a row, tracks extending longitudinally of the row of vats and upon which carriages are movable over the vats from vat to vat in the series, the carriages being formed of open frame work, an article support movable up and down on each carriage, the bottom of the carriage being open to permit the lowering of the articles on the support into a vat over which the carriage is positioned, and counterbalancing means connected to said support.

Signed at Chicago, Illinois, this 1st day of March, 1921.

AUGUST D. MEISELBACH.